United States Patent
Chin et al.

(10) Patent No.: US 10,120,151 B1
(45) Date of Patent: Nov. 6, 2018

(54) SYSTEM AND METHODS FOR COOLING OPTICAL COMPONENTS

(71) Applicants: Aland K. Chin, Sharon, MA (US); Richard H. Chin, Somerville, MA (US); Alan Nelson, Somerville, MA (US)

(72) Inventors: Aland K. Chin, Sharon, MA (US); Richard H. Chin, Somerville, MA (US); Alan Nelson, Somerville, MA (US)

(73) Assignee: SCIENCE RESEARCH LABORATORY, INC., Somerville, MA (US)

( * ) Notice: Subject to any disclaimer, the term of this patent is extended or adjusted under 35 U.S.C. 154(b) by 739 days.

(21) Appl. No.: 14/640,863

(22) Filed: Mar. 6, 2015

(51) Int. Cl.
G02B 6/42 (2006.01)
G02B 6/38 (2006.01)

(52) U.S. Cl.
CPC ......... *G02B 6/4296* (2013.01); *G02B 6/4268* (2013.01); *G02B 6/3814* (2013.01)

(58) Field of Classification Search
CPC ... G02B 6/3814; G02B 6/4268; G02B 6/4269
See application file for complete search history.

(56) References Cited

U.S. PATENT DOCUMENTS

| | | | |
|---|---|---|---|
| 4,575,181 A | 3/1986 | Ishikawa | |
| 5,619,602 A | 4/1997 | Sandstrom | |
| 5,864,644 A | 1/1999 | DiGiovanni et al. | |
| 6,865,316 B1* | 3/2005 | Pratt | G02B 6/4296 385/27 |
| 8,189,278 B2 | 5/2012 | Roos et al. | |
| 8,412,009 B2 | 4/2013 | Roos et al. | |
| 2003/0063884 A1* | 4/2003 | Smith | G02B 6/032 385/129 |
| 2004/0258363 A1* | 12/2004 | Shigihara | G02B 6/02 385/73 |
| 2007/0172174 A1 | 7/2007 | Scerbak et al. | |

FOREIGN PATENT DOCUMENTS

CN 104297841 A * 1/2015 .............. G02B 6/36

OTHER PUBLICATIONS

Campbell et al. "Comparison of Small Fibre Connectors for High-Power Transmission." Proc. SPIE. 7578(2010):75781R-1-75781R-11.
Hendron et al. "Stackable Wafer Thin Coolers for High Power Laser Diode Arrays." Proc. SPIE. 1219(1990):330-340.
Krause et al. "Microchannel Coolers for High Power Laser Diodes in Copper Technology." Proc. SPIE. 2148(1994):351-358.
Micro Cooling Concepts. www.microcoolingconcepts.com Retrieved May 5, 2015.

* cited by examiner

*Primary Examiner* — Omar R Rojas
(74) *Attorney, Agent, or Firm* — Burns & Levinson LLP; Orlando Lopez

(57) ABSTRACT

A cooling device includes a thermally conductive object having an opening configured to receive an optical component, the opening being configured such that the optical component is thermally and optically operationally connected to the thermally conductive and electrically conductive object. One or more cooling components, microchannel coolers in one instance, are also thermally operationally connected to the thermally conductive and electrically conductive object. Methods of use are disclosed.

14 Claims, 11 Drawing Sheets

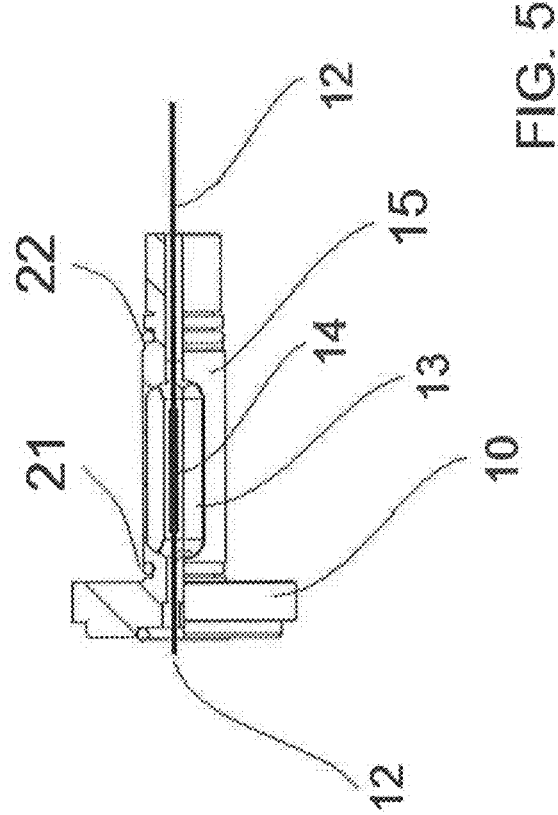
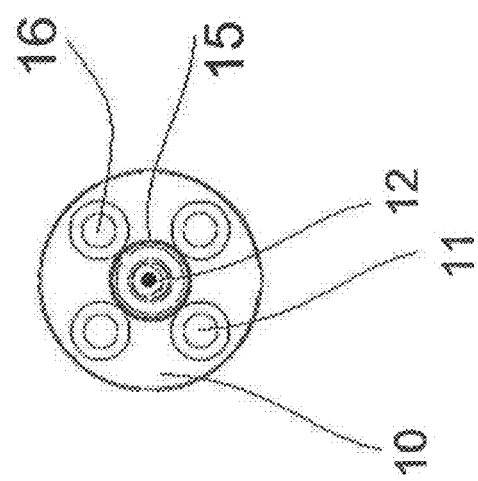
FIG. 5b
FIG. 5a

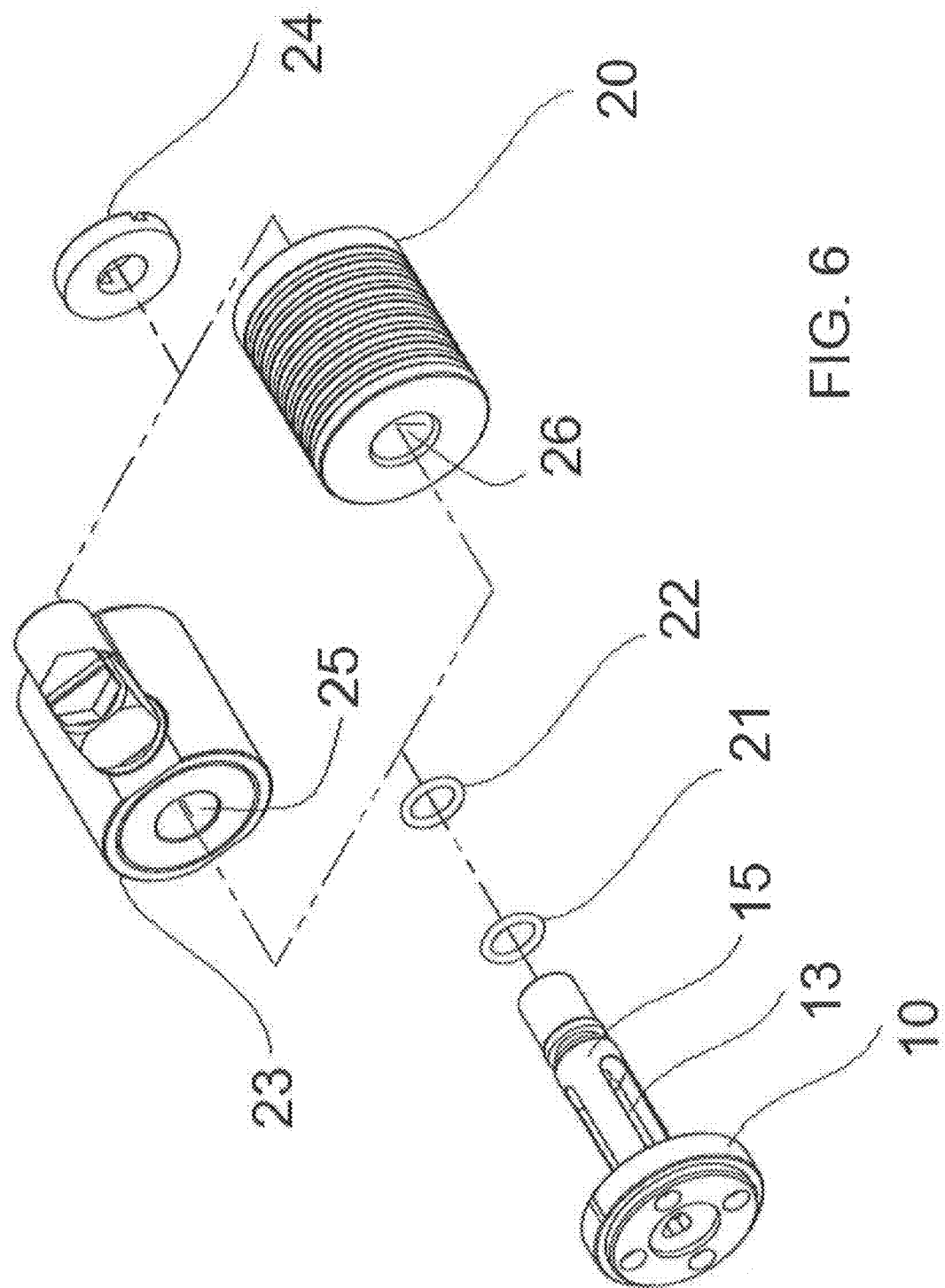

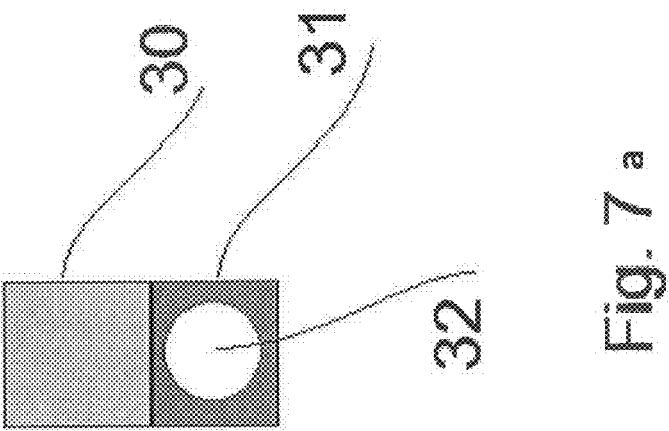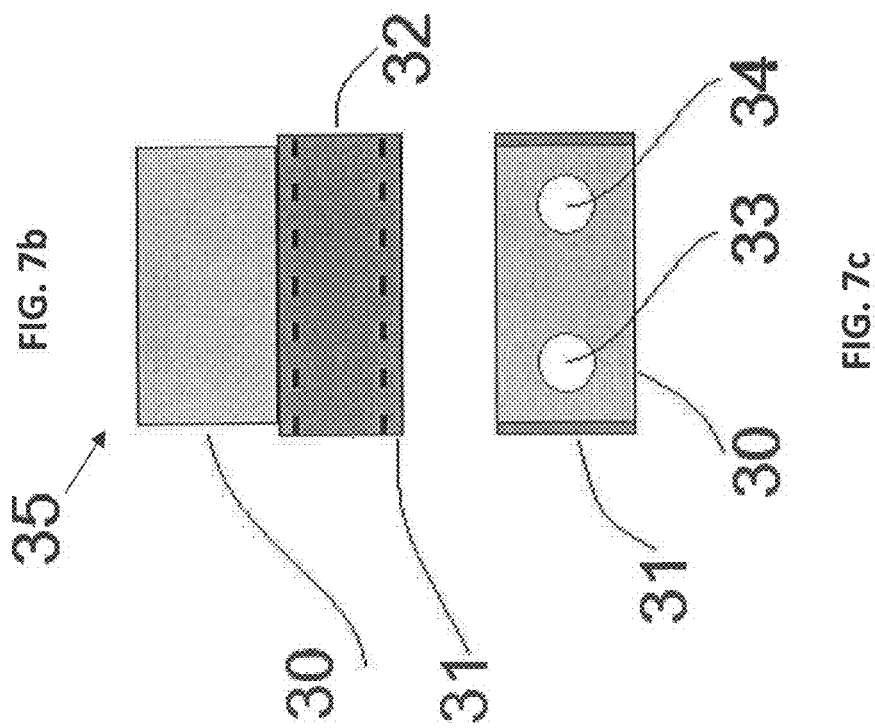

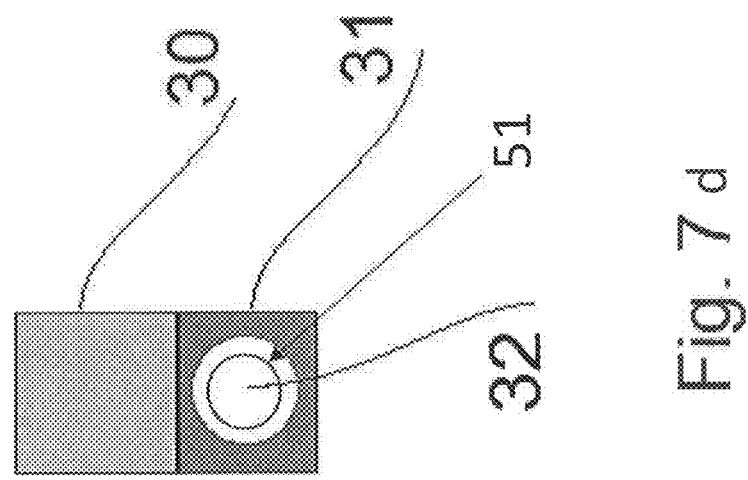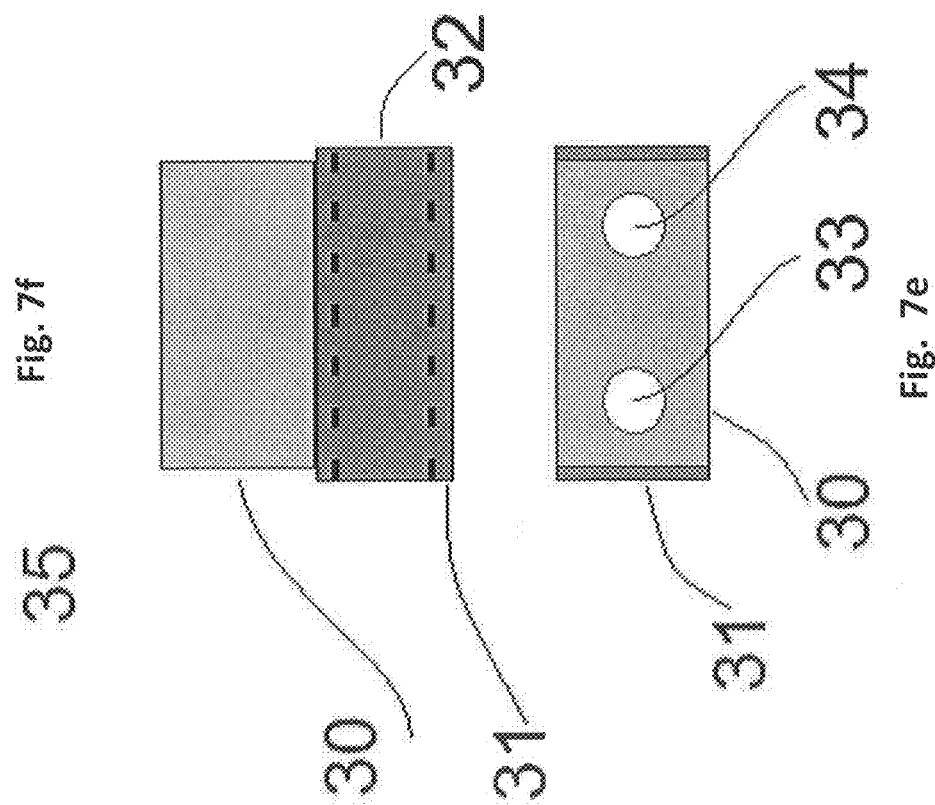

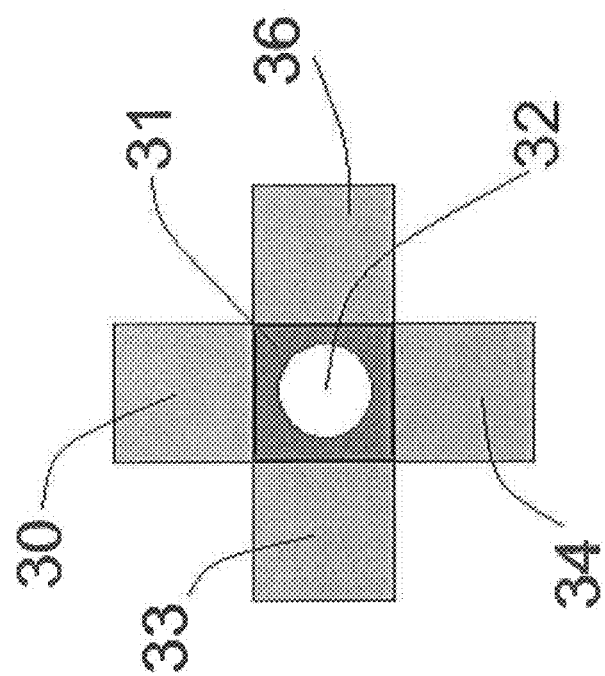
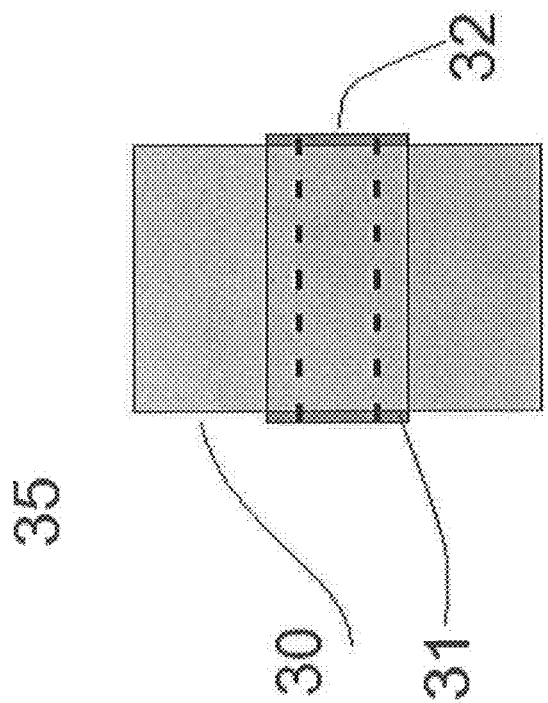

| Current (A) | Power into fiber (W) | Power out of Fiber (W) | Power into cooler (W) | Temp. at SMAQ (°C) |
|---|---|---|---|---|
| 20 | 53 | 44 | 9 | 22 |
| 40 | 141 | 105 | 36 | 26 |
| 60 | 229 | 164 | 65 | 30 |
| 80 | 317 | 221 | 96 | 35 |
| 100 | 405 | 270 | 135 | 38 |
| 105 | 427 | 280 | 147 | 40 |
| 110 | 449 | 291 | 158 | 40 |

Fig. 10

SYSTEM AND METHODS FOR COOLING OPTICAL COMPONENTS

BACKGROUND

The present teachings relate to a device for cooling optical components based on optical fibers for transmitting high optical power.

Fiber-coupled laser-diodes are used directly or as sources to optically-pump solid-state lasers, including fiber-lasers and fiber-amplifiers. In order to optimize the optical power coupled into the fiber core, a certain amount of optical power is also coupled into the fiber cladding. The power in the cladding is undesirable since it may cause damage to the solid-state laser. A mode stripper is used to remove the optical power in the fiber cladding. The mode stripper scatters the light in a localized region. The scattered light is generally absorbed for safety reasons and to prevent optical damage to the laser system. The power handling capability of the mode stripper is determined by the ability to remove the heat from the absorbed light. The mode stripper generally fails if the local temperature exceeds ~100° C. since there are polymers in close proximity.

In the traditional techniques, the heat is removed by an air cooled or water cooled heatsink. The thermal resistance of the heatsink, i.e. the ability of the heatsink to remove heat vary depending on the heatsink design. For military applications, these heatsinks need to be small in size and weight. Small (~2-4 cm in dimension) commercial air-cooled heatsinks remove ~30 W of heat and small commercial water-cooled heat-sinks remove ~85 W of heat. To remove larger amounts of heat, the size and weight of heat-sinks are generally unacceptable for military applications.

SUMMARY

In one instance, the present teachings provide a low-weight, small-size, very-efficient cooler for optical components in order to reach the optical stability which is required for transmitting very-high optical-power through an optical component such as, for example, an optical fiber. According to the present teachings, high mechanical-stability is achieved by providing a method for efficiently removing sufficient heat to limit a significant rise in temperature (<50° C.) of the optical component.

According to the present teachings, the waste optical-power from an optical component is substantially absorbed by a thermally conductive object having an opening configured to receive the optical component, the thermally conductive object being thermally operationally connected to the optical component. One or more cooling components, micro-channel cooler (MCC) heatsinks in one embodiment, are attached to the thermally conductive object to remove the heat generated by the absorbed optical-power.

In one instance of the present teachings, the optical component is a fiber-optic mode-stripper or a tapered fused-fiber combiner.

In another instance, the thermally conductive object is a metal object that is copper, silver, or aluminum based.

According to the present teachings, in one instance, the thermally conductive object is tubular in shape with the optical component located within the metal cavity.

According to the present teachings, in one instance, the internal surface of the opening in the thermally conductive object is coated with a thin film whose absorption coefficient at the operating spectral region of the optical component exceeds that of the metal.

In one or more instances, the micro-channel coolers are copper based and the coolant consists of a solution of water and ethanol.

In one embodiment, the MCC heatsink is attached to the metal cavity by soldering. In the following, the invention will be described in more detail in connection with the accompanying drawings in which it is schematically illustrated some examples of the invention.

BRIEF DESCRIPTION OF THE DRAWINGS

FIGS. 5a-5b show an end view and a side view of a basic conventional commercial tubular female holder of an optical fiber connector;

FIG. 6 shows of a conventional basic commercial tubular female holder of an optical fiber connector with option of either a air-cooled heatsink or a water-cooled heatsink;

FIGS. 7a-7c show various views of one embodiment of a device of these teachings that is designed for use with basic commercial tubular female holder of an optical fiber connector;

FIGS. 7d-7f show various views of another embodiment of a device of these teachings that is designed for use with basic commercial tubular female holder of an optical fiber connector;

FIGS. 8a-8b show the side and end view of another embodiment of the device of these teachings that is designed for use with basic commercial tubular female holder of an optical fiber connector;

FIG. 10 shows results from the exemplary embodiment of FIG. 9.

DETAILED DESCRIPTION

Embodiments of the cooling device of these teachings are presented herein below. In one or more embodiments, the cooling device of these teachings includes a thermally conductive object having an opening configured to receive an optical component, in the opening being configured such that the optical component is thermally and optically operationally connected to the thermally conductive object. In one instance, the object can also be an electrically conductive object. One or more cooling components, microchannel coolers in one instance, are also thermally operationally connected to the thermally conductive object. Undesirable optical power from the optical component is absorbed by the thermally conductive object and the one or more cooling components, microchannel coolers in one instance, remove heat from the absorbed optical power. In one instance of the present teachings, the optical component is a fiber-optic mode-stripper or a tapered fused-fiber combiner (see, for example, U.S. Pat. No. 5,864,644, which is incorporated by reference herein in its entirety and for all purposes).

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

Figure 1:
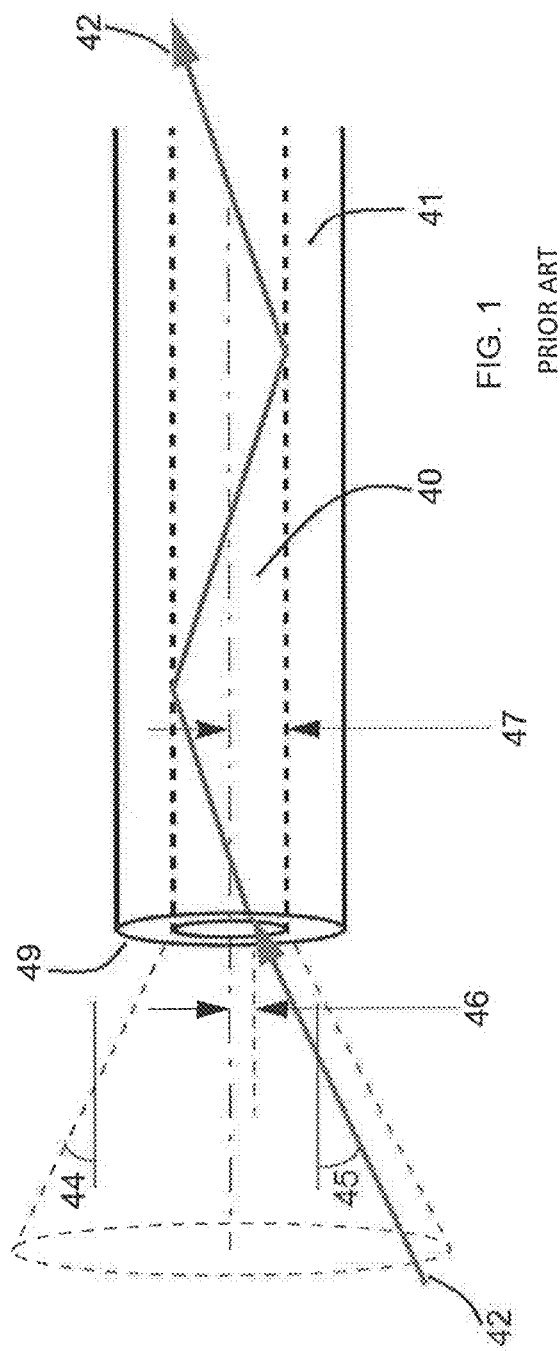
FIG. 1 is a schematic of a conventional single clad optical fiber with circular cross-section with light entering within the physical aperture and numerical aperture of the core.

An optical fiber is a very low loss method of transmitting optical power. Basically, an optical fiber consists of a core and one or more cladding layers. A typical optical fiber with a core 40, a single cladding-layer 41 and a circular cross-section is shown in FIG. 1. To transmit optical power 42 within the core, the index of refraction of the core material must exceed that of the cladding layer. The difference between the index of refraction between the core material and the cladding-layer material defines angle 44, the largest angle of incidence for an optical ray 42 that is incident on the core area of the fiber end for which the optical ray is trapped within the core by total internal-reflection. The numerical aperture (NA) for the fiber is the inverse sine of angle 44.

Figure 2:
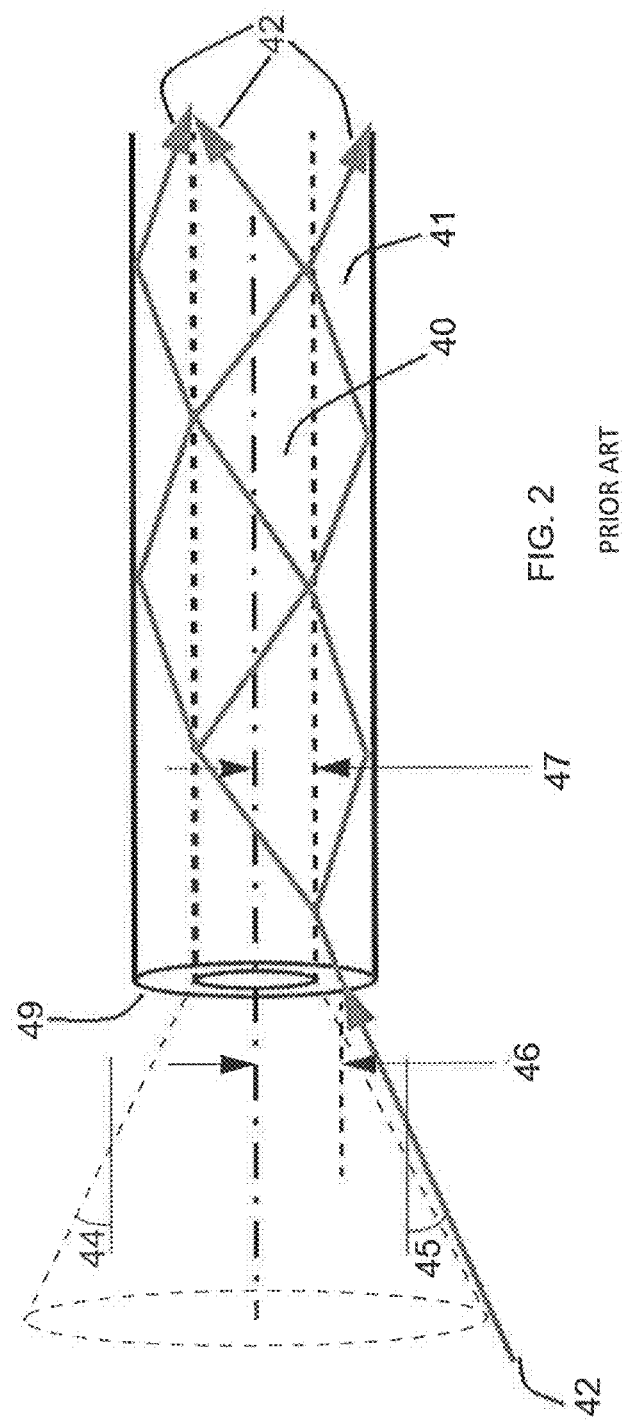
FIG. 2 is a schematic of a conventional single clad optical fiber with circular cross-section with light entering within the physical aperture of the cladding layer and within the numerical aperture of the core.

If an optical ray is incident on the cladding layer of the incident fiber end 49 with an angle of incidence 45 that is smaller than the NA, then the light is trapped within the cladding layer 41 as shown in FIG. 2.

Figure 3:
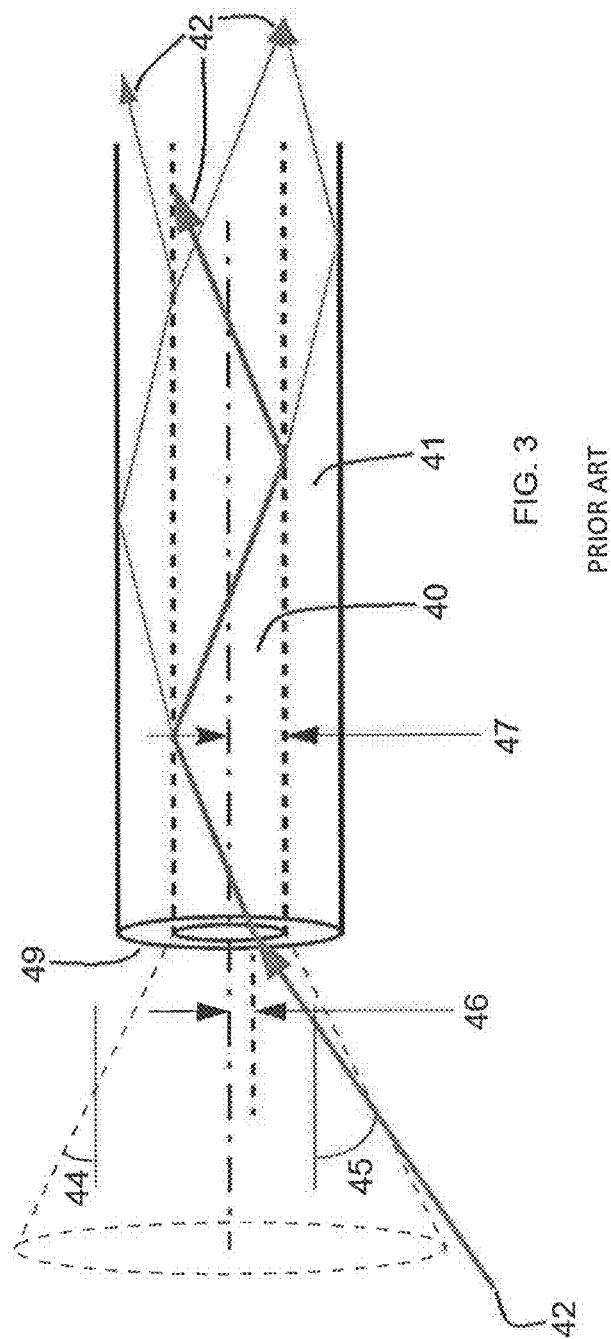
FIG. 3 is a schematic of a conventional single clad optical fiber with circular cross-section with light entering within the physical aperture of the core and exceeding the numerical aperture of the core.

If an optical ray is incident on the core of the fiber end with an angle of incidence 45 that exceeds the NA, then the light is trapped within the cladding layer 41 as shown in FIG. 3.

Figure 4:
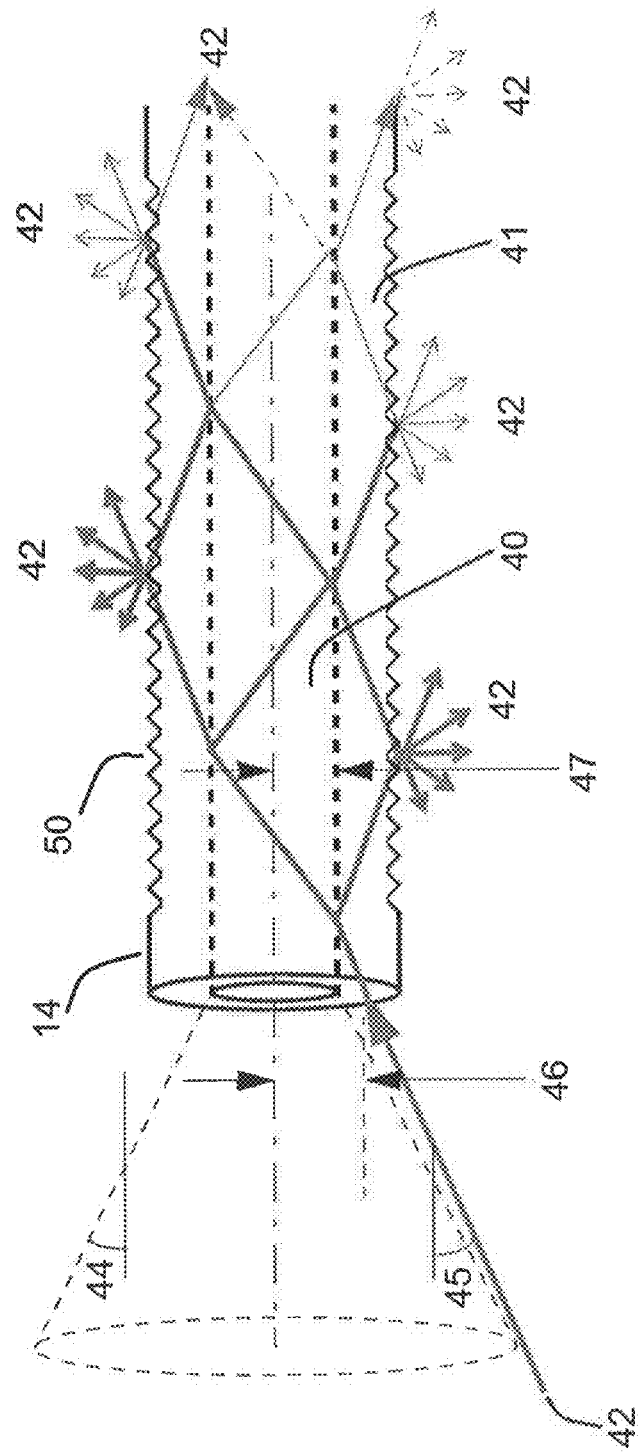
FIG. 4 is a schematic of a conventional mode stripper for a single clad optical fiber with circular cross-section with light entering within the physical aperture of the cladding layer and exceeding the numerical aperture of the core.

Light trapped within the cladding layer is undesirable since it may damage optical components connected to the other end of the optical fiber. Light trapped within the cladding layer can be removed using a mode stripper (see, for example, U.S. Pat. No. 4,575,181, U.S. Pat. No. 5,619,602, S. Campbell, O. Blomster, and M. PAilsson, "Comparison of small fiber connectors for high-power transmission", Proc. Of the SPIE, vol. 7578, pp. 75781R-1-75781R-11 (2010), U.S. Pat. No. 8,412,009, U.S. Published Patent Application 2007/0172174 and U.S. Pat. No. 8,189,278, all of which are incorporated by reference herein in their entirety and for all purposes). An example of a mode stripper 14 is shown in FIG. 4. Basically, the external surface of the optical fiber 50 is modified, e.g. roughened with surface variations exceeding several wavelengths of the transmitted light, so that light that impinges on this surface is scattered out of the cladding layer. Typically, the scattering occurs over a distance of several centimeters. When scattering high optical-power (more than ~1 W), the scattered light must be contained so that it does not cause unintentional damage to people or equipment.

Containment of the scattered light is accomplished by inserting the mode stripper 14 within a tube 10. FIGS. 5a-5b show a commercial tube and which also serves as a fiber-optic bulkhead-connector, using four holes 16 for mounting. The scattered light is transmitted through multiple openings 13 that are approximately the length of the mode stripper 14. The scattered light that is transmitted through the openings 13 are absorbed by the internal surface of a heatsink that is attached to the tube 10.

FIG. 6 shows a commercial air-cooled and water-cooled heatsink designed to mate with commercial tube 10. The heatsinks have cylindrical openings 25, 26 that allow the heatsink to slip tightly over cylindrical portion 22 of tube 10. The light scattered by the mode stripper 14 is transmitted through openings 13 and absorbed by the internal surface of the openings 25, 26 in the heatsink. The heat is eventually dissipated by the heatsink. The power handling capability of a mode stripper is limited by the ability of the heatsink to remove the heat. The commercial air-cooled heatsink 20 is designed to dissipate ~30 W of heat. The air-cooled heatsink is roughly a cylinder whose diameter is 19 mm and whose length is 20 mm. The volume is ~6 cm$^3$. The weight is ~10 gm. The commercial water-cooled heatsink 23 is designed to dissipate ~85 W of heat. The water cooled heatsink is roughly a cylinder whose diameter is 20 mm and whose length is 34 mm. The volume is ~10 cm$^3$. The weight is ~48 gm.

FIGS. 7a-7c show one embodiment of the present teachings, a heatsink 35 with low size and weight for a mode stripper with the capability of removing several kilowatts of heat. To make a direct comparison of performance with the commercial units, the heatsink 35 in one embodiment is designed to mate with a commercially available tube 10 for inserting a mode stripper.

In one instance, the thermally conductive object of these teachings is a metal object. In some embodiments, the metal object comprises at least one of copper, silver or aluminum.

The air-cooled 20 or water-cooled heatsink 23 is replaced by item 35 of FIG. 7b. Item 35 includes two parts, a cooling device, a microchannel cooler in the embodiment shown, 30 and an absorbing fixture (a thermally conductive object) 31. Preferably the microchannel cooler and the absorbing fixture are constructed in one piece but the manufacturing cost would be significantly higher than constructing them in two pieces and soldering them together. In one instance, the microchannel coolers are copper-based microchannel coolers. In one or more instances, the coolant solution used in the microchannel coolers comprises a solution of water and ethanol.

In another embodiment, shown in FIG. 7d, the thermally conductive object includes a metal object having an opening configured to receive the optical component and a thin-film 51 disposed on an internal surface of the opening; the thin film having an absorption coefficient in an operating spectral region of the optical component that exceeds an absorption coefficient of the metal object. FIGS. 7e and 7f are similar to FIGS. 7b and 7c. Exemplary embodiments of the thin film include carbon, germanium, lead, tungsten, molybdenum thin films.

Microchannel coolers are typically used as heatsinks for high-power laser-diode bars. Because of the low volume of usage, there are no standard microchannel coolers. For an exemplary embodiment, an SA-2 cooler heatsink manufactured by Micro Cooling Concepts was chosen for its low thermal-resistance and very-small volume. The SA-2 has the form of a hexahedron whose dimensions are 10 mm×10 mm×20 mm. The volume and weight for Item 35 is ~4 cm$^3$ and 24 gm, respectively. These values are considerably smaller than those for the commercial water cooled heatsink 23.

Cylindrical opening 32 in absorbing fixture 31 allows item 35 to slip tightly over tubular portion 22 of tube 10. The light scattered by the mode stripper 14 is transmitted through openings 13 and absorbed by the internal surface of the cylindrical opening 32. The heat is conducted by the absorbing fixture 31 to the microchannel cooler 30.

Preferably, the material of the absorbing fixture 31 is mainly copper since a high thermal conductivity improves the heat removal capability of the item 35. Copper has the highest thermal conductivity of metals at ~20° C. In one exemplary instance, the MCC(s) are of the SA-2 cooler design from Micro Cooling Concepts where the coolant impinges on the surface to be cooled. The SA-2 microchannel cooler has the lowest reported thermal impedance and can easily remove more than 1000 W of heat. From the Micro Cooling Concepts description, the thermal resistance of the SA-2 cooler is less than 0.04° C./W using water as a coolant with a flow rate of 1 LPM. Lower thermal-resistance can be achieved with higher flow-rates. The temperature rise for a kilowatt of absorbed heat is less than 40° C. (0.04° C./W×1000 W).

To remove more than 1000 W of heat and maintaining a low temperature rise, additional microchannel coolers 33, 34, and 36 can be attached to absorbing fixture 31. In FIGS. 8a-8b, absorbing fixture 31 has a rectangular cross-section allowing easy attachment of four microchannel coolers. To attach an even larger number of microchannel coolers, the cross-section of absorbing fixture 31 can be a polygon with more than 4 sides so that one cooler can be attached to each side.

In one instance, an indirect evaluation was performed. A 9.5 mm wide, 20% fill-factor, 980 nm laser-diode bar was operated with ~140 W of output power. This power represents the optical power that would be scattered by a mode stripper. The laser beam was ~10 mm by 5 mm at the surface of the copper absorbing-fixture 31. Only a portion of the light was absorbed since the surface of absorbing fixture was bare copper. Thermocouples were placed on various locations on the inside surface of opening 32 and on the external surfaces of the absorbing fixture 31 as shown. The water coolant at the inlet to microchannel cooler 30 was 20° C. and the flow rate was 1 LPM. The steady-state temperatures measured by the thermocouples ranged from 22° C. to 43° C.

Figure 9:
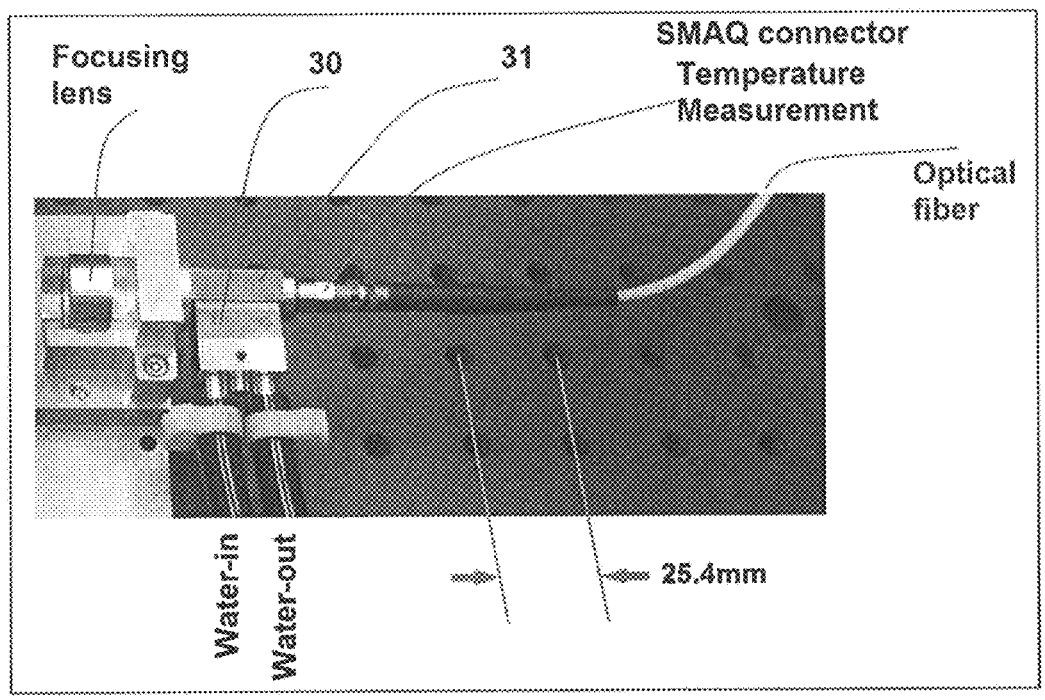
FIG. 9 is a pictorial representation of an exemplary embodiment of the system of these teachings.

In one exemplary embodiment, shown in FIG. 9, a copper block 31 surrounds a mode-stripper of an Optoskand SMAQ connector. An SA-2A microchannel cooler 30 from Microcooling Concepts is thermally operatively connected to the copper block.

FIG. 10 shows the test results on a water-cooled connector using the exemplary embodiment shown in FIG. 9. Optical power was increased incrementally from 9 W to 158 W while monitoring the temperature of the SMAQ connector as shown in FIG. 9. At 158 W into the water-cooled holder, more than twice the rated 75 W power of the commercial Optoskand water-cooled holder, the temperature of the SMAQ connector is only 40° C. while, for the commercial Optoskand water-cooled holder, the temperature would exceeds ~80° C.

It should be noted that these teachings are not limited only to the exemplary embodiments.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

The invention claimed is:

1. A cooling device comprising:
   a thermally conductive metal object having an opening configured to receive a fiber optic connector, the opening being configured such that the received fiber optic connector is thermally and optically operatively connected to the thermally conductive metal object; a solid portion of the thermally conductive metal object being configured to completely wrap around the fiber optic connector; and
   one or more microchannel coolers thermally operatively connected to the thermally conductive metal object; the cooling device configured to remove more than 500 Watts of waste optical power from the fiber optic connector.

2. The cooling device of claim 1 wherein the thermally conductive metal object is configured to absorb waste optical power from the fiber optic connector.

3. The cooling device of claim 1 wherein the thermally conductive metal object comprises at least one of copper, silver or aluminum.

4. The cooling device of claim 1 wherein the thermally conductive metal object comprises:
   a thin-film disposed on an internal surface of the opening; the thin film having an absorption coefficient in an operating spectral region of the fiber optic connector that exceeds an absorption coefficient of the metal object.

5. The cooling device of claim 1 wherein the microchannel coolers are copper-based microchannel coolers.

6. The cooling device of claim 5 wherein the coolant solution used in the microchannel coolers comprises a solution of water and ethanol.

7. The cooling device of claim 1 wherein the one or more microchannel coolers are operatively connected to the thermally conductive metal object by soldering the one or more cooling components to the thermally conductive metal object.

8. The cooling device of claim 1 wherein the fiber optic connector is a fiber optic mode stripper.

9. The cooling device of claim 1 wherein the fiber optic connector is a tapered fused-fiber combiner.

10. A method for removing more than 500 Watts of waste optical power from a fiber optic connector, the method comprising:
   inserting the fiber optic connector in an opening in a thermally conductive metal object; the opening being configured such that the fiber optic connector is thermally and optically operatively connected to the thermally conductive object; wherein at least a solid portion of the thermally conductive metal object completely wraps around the fiber optic connector; and
   thermally operatively connecting one or more microchannel coolers to the thermally conductive metal object;
   waste optical power from the optical component being substantially absorbed by the thermally conductive object and heat generated by absorbed waste optical power being removed by the one or more microchannel coolers wherein more than 500 Watts of the waste optical power can be removed.

11. The method of claim 10 wherein the thermally conductive metal object comprises at least one of copper, silver or aluminum.

12. The method of claim 10 wherein the thermally conductive metal object comprises:
   a thin-film disposed on an internal surface of the opening; the thin film having an absorption coefficient in an operating spectral region of the optical component that exceeds an absorption coefficient of the metal object.

13. The method of claim 10 wherein the opening in a thermally conductive metal object is configured such that the fiber optic connector is a fiber optic mode stripper.

14. The method of claim 10 wherein the opening in a thermally conductive metal object is configured such that the fiber optic connector is a tapered fused-fiber combiner.

* * * * *